(12) United States Patent
Roeck et al.

(10) Patent No.: US 7,058,559 B1
(45) Date of Patent: Jun. 6, 2006

(54) METHOD AND APPARATUS FOR SIMULATING A PLURALITY OF CABLE MODEMS

(75) Inventors: Guenter Roeck, San Jose, CA (US); Joseph B. O'Donnell, Fremont, CA (US); Mark Millet, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 726 days.

(21) Appl. No.: 10/323,198

(22) Filed: Dec. 18, 2002

(51) Int. Cl.
*G06F 13/12* (2006.01)
(52) U.S. Cl. .......................... 703/21; 725/111; 375/222
(58) Field of Classification Search .................. 703/21; 375/222; 709/217; 725/111; 370/241; 379/1.04
See application file for complete search history.

(56) References Cited

U.S. PATENT DOCUMENTS

| | | | | |
|---|---|---|---|---|
| 4,607,364 A | * | 8/1986 | Neumann et al. | 370/470 |
| 5,619,725 A | * | 4/1997 | Gordon | 710/19 |
| 6,249,913 B1 | * | 6/2001 | Galipeau et al. | 725/76 |
| 6,625,255 B1 | * | 9/2003 | Green et al. | 379/1.04 |
| 6,662,135 B1 | * | 12/2003 | Burns et al. | 702/120 |
| 6,894,801 B1 | * | 5/2005 | Hartman | 358/1.15 |

OTHER PUBLICATIONS

Gambit Communications, Inc. "MIMIC Cable Modem Simulator", www.gambitcomm/site/products/CableModem.shtml, Copyright 1996-2003 pp. 1-2.
SimpleSoft, Inc., "Simple Tester's DOCSIS OSS Cable Modem Test Suites-Add-on Modules for SimpleTester the Standard for SNMP Testing", www.snmptest.com/osscm.html, printed Oct. 7, 2003, pp. 1-2.
SimpleSoft, Inc., "Product Updates", www.smplsft.com/updates.html, printed Oct. 7, 2003, pp. 1-4.
SimpleSoft, Inc. "Simple Tester Release Notes" www.snmptest.com/stnews.html, printed Oct. 7, 2003, pp. 1-9.

* cited by examiner

*Primary Examiner*—Albert W. Paladini
(74) *Attorney, Agent, or Firm*—Beyer Weaver & Thomas, LLP

(57) ABSTRACT

Disclosed is an apparatus and method for simulating a plurality of cable modems for testing a device, such as a head end complex. In general terms, the present invention provides a multiple cable modem simulator and techniques for setting up and executing the same. In one implementation, the multiple cable modems are simulated by simulating multiple MAC (media access control) state machines for multiple cable modems. In other embodiments, a simulator of the present invention includes a mechanism for simulating physical operating conditions of the simulated cable modems. For example, even when the simulator is located at a single test location, different distances and power levels may be simulated for the different simulated cable modems.

52 Claims, 11 Drawing Sheets

METHOD AND APPARATUS FOR SIMULATING A PLURALITY OF CABLE MODEMS

BACKGROUND OF THE INVENTION

1. Field of the Invention

The present invention relates to testing data receipt and transmission over cable plants using cable modems. More specifically, it relates to testing a head end complex in relation to a plurality of cable modems which connect to and send data to the head end complex and receive data from such head end complex.

2. Description of the Related Art

Cable modem technology is in a unique position to meet the demands of users seeking fast access to information services, the Internet and business applications, and can be used by those interested in cablecommuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. Cable companies are now typically full service providers of video, voice and data telecommunication services.

The Data over Cable Service Interface Specification (DOCSIS) protocol defines a standard for transmitting data over a cable system or plant. That is, DOCSIS defines communication between a head end or distribution hub and its associated cable modems. The head end is also referred to as a cable modem termination system or CMTS. The CMTS and its associated cable modems form part of a DOCSIS system. When the CMTS is upgraded or changed, it is then necessary to test the CMTS's function with respect to multiple associated cable modems.

FIG. 1 represents a conventional DOCSIS system 100 for testing a head end 102. As shown, the system 100 includes a head end 102 coupled with a plurality of cable modems 110. Typically, there are thousands of cable modems located at a single test site (not shown). The cable modems are coupled to a switch 112, which is in turn coupled with a traffic generator 114. The traffic generator 114 is typically configured to analyze data sent from the head end 102 to the cable modems 110, e.g., to determine whether the data is reliably received by the cable modems. The traffic generator 114 is also typically configured to generate traffic to be sent back to the CMTS.

A conventional cable modem test bed presents many challenges and disadvantages. For example, both the switch 112 and traffic generator 114 must be capable of supporting thousands of cable modems. Additionally, traditional DOCSIS modem test beds, such as the test bed of FIG. 1, can be very expensive and complex. A test bed with 10,000 modems will easily cost more than $1M, and require 78 racks (with 128 modems per rack) of space.

Therefore, it would be desirable to provide improved mechanisms for simulating a plurality of cable modems. Additionally, this improved simulation system would be capable of simulating operating conditions for each of the simulated cable modems, such as the distance from each cable modem to the head end and the power level of each cable modem.

SUMMARY OF THE INVENTION

Accordingly, the present invention provides an apparatus and method for simulating a plurality of cable modems for testing a device, such as a head end complex. In general terms, the present invention provides a multiple cable modem simulator and techniques for setting up and executing the same. In one implementation, the multiple cable modems are simulated by simulating multiple MAC (media access control) state machines for multiple cable modems. In other embodiments, a simulator of the present invention includes a mechanism for simulating physical operating conditions of the simulated cable modems. For example, even when the simulator is located at a single test location, different distances and power levels may be simulated for the different simulated cable modems.

In one embodiment, a multiple cable modem simulator system for simulating a plurality of cable modems within a test system that includes a test device, such as a head end complex, whose operation is being tested in relation to the simulated cable modems is disclosed. The system generally includes a plurality of simulated cable modems operable to emulate a plurality of cable modems in communication with the test device through a multiplexed downstream/upstream channel and an operating conditions simulator operable to simulate one or more physical operating conditions of the simulated cable modems. The system further includes a data generator and analyzer for generating data to be sent from the simulated cable modems to the test device and for analyzing data sent between the simulated cable modems and the test device, wherein the data generator and analyzer provides a secondary interface, in addition to the downstream/upstream channel, for communicating with the test device.

In a specific implementation, the plurality of simulated cable modems and the operating conditions simulator takes the form of a processor, one or more memory devices, and one or more digital signal processing (DSP) devices. In yet another specific implementation, the simulated cable modems and the operating conditions simulator are integrated within a single device. In one aspect, the system includes a receiver for receiving a multiplexed downstream signals from the test device on the downstream channel and tuning the multiplexed signal so as to output the downstream signal to a selected one of the simulated cable modems. The receiver is also operable to convert the downstream signal from a modulated format into a digital format. In further aspect, the system further includes a media access controller (MAC) decoder coupled to the operating conditions simulator so as to receive the downstream signal and to output it to a selected one of the simulated cable modems.

In a further implementation, each simulated cable modem comprises a MAC instance for performing data processing operations of a DOCSIS compatible cable modem. In yet a further embodiment, the system further includes one or more simulated customer premises equipment (CPE) devices associated with one or more of the simulated cable modems.

In yet a further aspect, the system includes a transmission scheduler for scheduling data transmitted from the simulated cable modems to the test device. The transmission scheduler is configured to receive data transmitted from the simulated cable modems and transmit the data as an upstream signal to the test device. They system also includes a transmission device for converting the upstream signal's format from a digital format to a modulated format. In a further aspect, the data generator and analyzer is further operable to generate data and transmit it through a selected one of the simulated cable modems to the transmission scheduler.

In one aspect, the transmission scheduler is further operable to identify a sending one of the simulated cable modems and then transmit data from the sending simulated cable modem in a time slot associated with such sending simulated cable modem. In another aspect, the transmission scheduler is further operable to time multiplex data sent from the simulated cable modems onto the upstream signal. In another embodiment, the system further includes an event handler for handling events initiated by the simulated cable modems and the data generator and analyzer.

In an alternative embodiment, the system has multiple upstream/downstream channels. In one implementation, the system includes a plurality of receivers for receiving a plurality of multiplexed downstream signals from the test device on a plurality of downstream channels and outputting a plurality of downstream signals and a plurality of MAC decoders each for receiving a selected one of the downstream signals and for outputting it to a selected one of the simulated cable modems. The simulated modems are grouped into sets and the simulated cable modem sets are operable to transmit data in the form of a plurality of upstream signals. The system further includes a plurality of transmission device converting a selected one of the upstream signal's format from a digital format to a modulated format.

In specific embodiments, the operating conditions of the simulated cable modems include one or more of the following: a simulated distance between each simulated cable modem and the test device, a simulated power level of a data signal transmitted by each simulated cable modem, a simulated noise insertion, a simulated signal distortion of a data signal transmitted by each simulated cable modem, and a simulated collision data transmitted from two or more of the simulated cable modems.

In an alternative embodiment, the invention pertains to a method for simulating a plurality of cable modems. A plurality of simulated cable modem instances are set up. A plurality of operating conditions are set up for the simulated cable modem instances. Execution of the simulated cable modem instances is commenced. Events associated with the simulated cable modem instances are then handled. The events include monitoring of data sent between the simulated cable modem instances and a test device whose operation is being tested with respect to the simulated cable modem instances.

In one aspect, setting up the simulated cable modem instances includes selecting a number of simulated cable modem instances, selecting an identifier (e.g., a unique MAC address) for each simulated cable modem instance, and selecting an initial execution time for each simulated cable modem instance. In a further aspect setting up the simulated cable modem instances includes selecting an initial state of each simulated cable modem instance and selecting one or more operating condition ranges for each simulated cable modem instance, wherein each operating range defines a limit to a simulating cable modem's simulated operation.

In one implementation, the operating conditions for each simulated cable modem is set up by selecting an initial and/or variable power level for a data signal transmitted from the each simulated cable modem. In another implementation, the operating conditions for each simulated cable modem include a simulated timing offset for a data signal transmitted from the each simulated cable modem so as to simulate a distance between the each simulated cable modem and the test device.

In one aspect, the operating conditions for each simulated cable modem are selected from a group consisting of a simulated distance between each simulated cable modem and the head end, a simulated power level, a simulated noise insertion, and a simulated signal distortion of a data signal transmitted by each simulated cable modem. In a further aspect, the simulated noise insertion defines a plurality of noise levels to be inserted into the data signal at a plurality of times, and the simulated signal distortion defines a plurality of signal distortion profiles to be simulated onto the data signal at a plurality of times.

In one aspect, an assigned timing offset is obtained for each simulated cable modem instance and when data is to be transmitted from a selected simulated cable modem instance to the test device, delaying such data transmission by an amount equal to the assigned timing offset plus the selected simulated timing offset. In a further aspect, when data is to be received by a selected simulated cable modem instance from the test device, such data receipt is delayed by an amount equal to the selected simulated timing offset.

In a further aspect, when data is to be transmitted from a selected simulated cable modem instance to the test device in the form of a data signal, adjusting a power level of the data signal to be about equal to the selected initial or the variable power level. In yet a further aspect, the test device is a head end complex and the power level of the data signal is varied during a periodic ranging operation with the head end complex. In yet another implementation, the power level of the data signal is also varied after a periodic ranging operation with the head end complex.

In a further embodiment, the operating conditions include a simulated collision of data transmitted from two or more of the simulated cable modems to the test device. In yet another aspect, a digital data pattern is selected for each of the two or more simulated cable modems which are to have a collision, the digital data patterns for the two or more simulated cable modems which are to have a collision are then combined into a single simulation data pattern. The simulation data pattern is then transmitted to the test device.

In yet another embodiment, the invention pertains to a computer readable medium that contains program instructions for simulating a plurality of cable modems. The computer readable medium includes computer readable code for performing one or more of the above described methods.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides a multiple cable modem simulator. In one implementation, the multiple cable modems are simulated by simulating multiple MAC (media access control) state machines for multiple cable modems. In other embodiments, a simulator of the present invention includes a mechanism for simulating physical operating conditions of the simulated cable modems. For example, even when the simulator is located at a single test location, different distances and power levels may be simulated for the different simulated cable modems.

Figure 1:
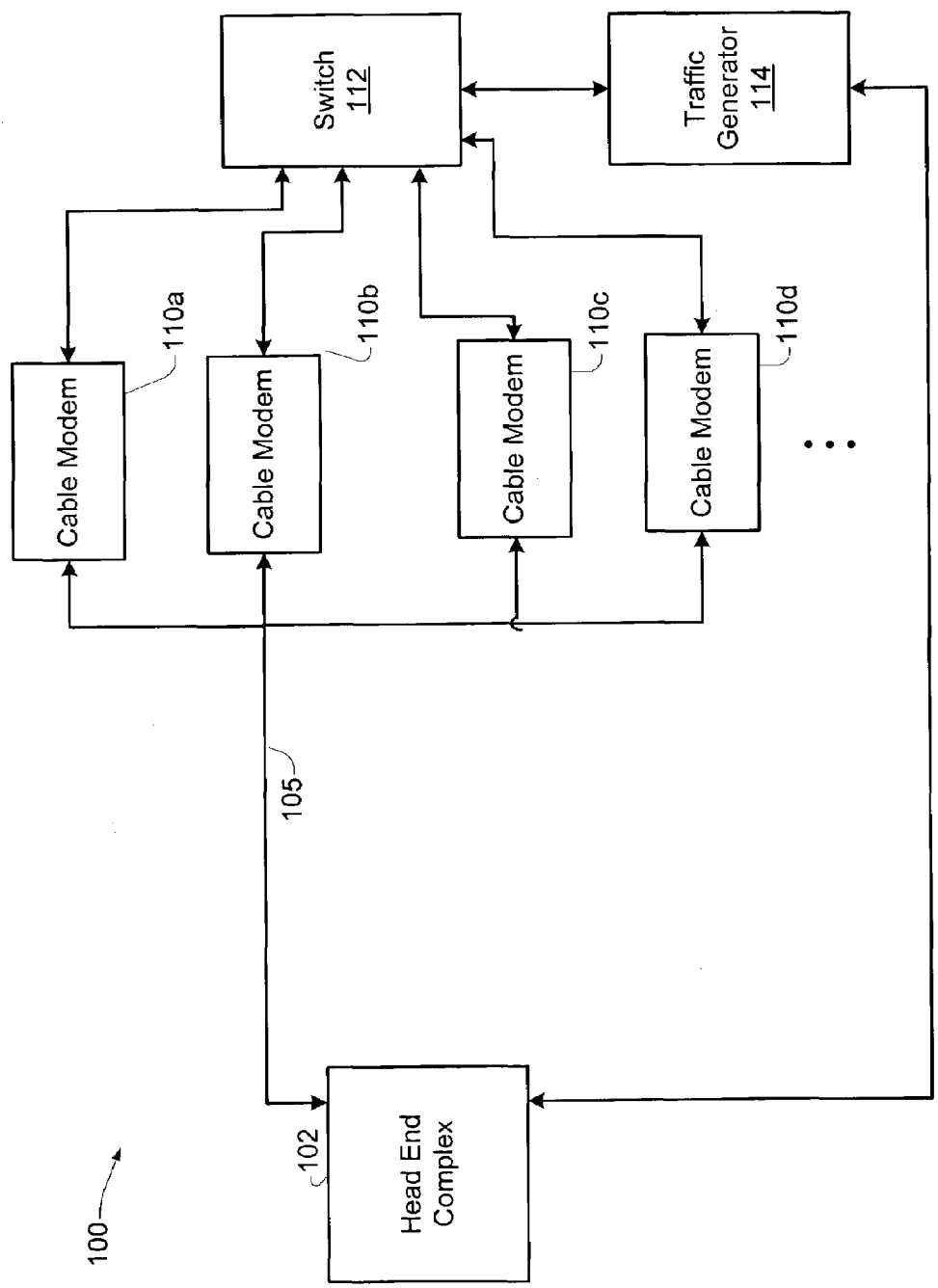
FIG. 1 is a diagrammatic representation of a conventional DOCSIS system for testing a head end.
Figure 2:
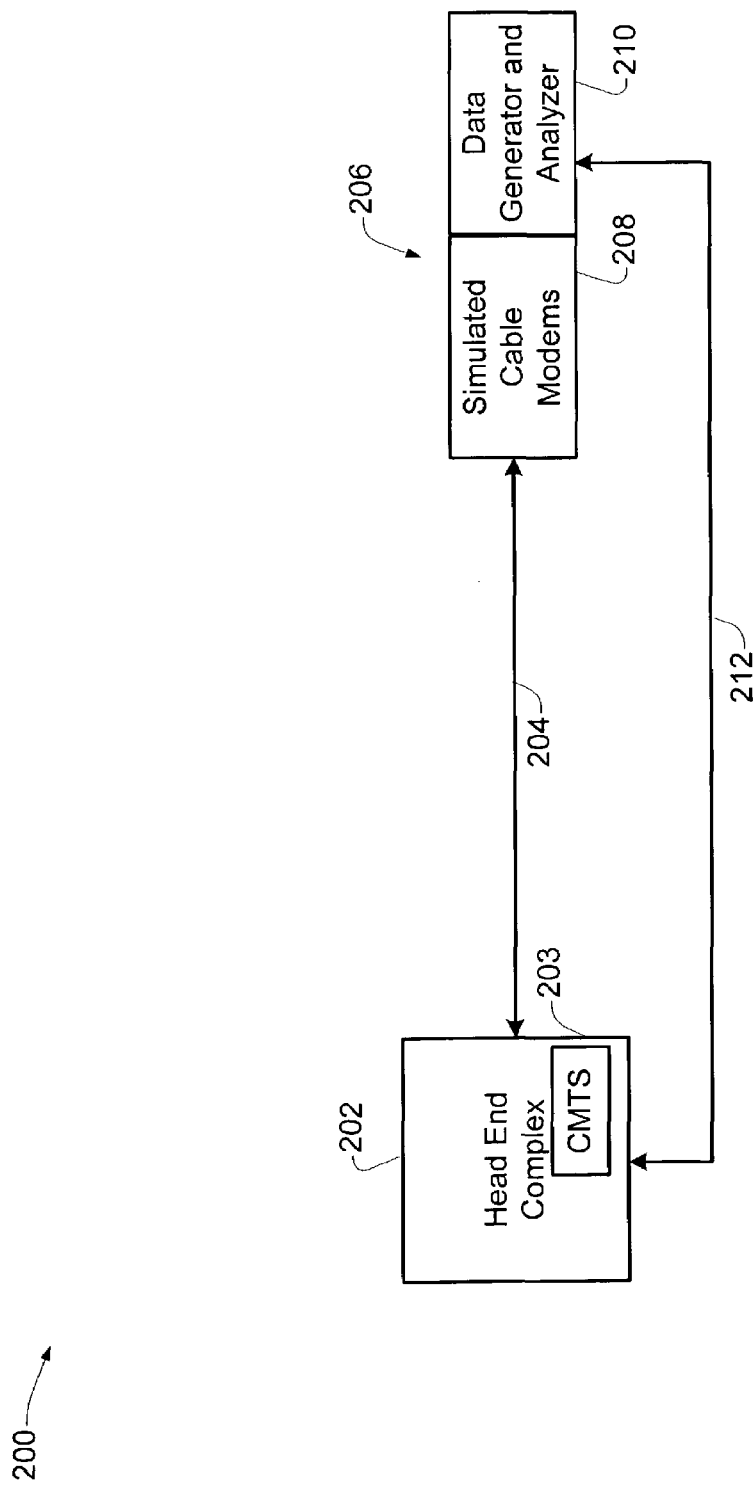
FIG. 2 is a diagrammatic representation of a test bed system for testing a head end complex in accordance with one embodiment of the present invention.

FIG. 2 is a diagrammatic representation of a test bed system for testing a Head End Complex 202 in accordance with one embodiment of the present invention. As shown, the Head End Complex 202 is coupled with a Multiple Cable Modem (CM) Simulator 206. The Head End Complex 202 typically includes a Cable Modem Termination System (CMTS) 203. The CMTS may include the following operations: (1) receiving data inputs from external sources and converting the data for transmission over the cable plant; (2) providing appropriate Media Access Control (MAC) level packet headers for data received by the cable system, and (3) modulating and demodulating the data to and from the cable network. Typically, the Head End Complex 202 is configured to provide a communication interface between nodes (e.g. cable modems) in the cable network and external networks such as, for example, the Internet (not shown).

Although not shown, one or more fiber nodes may be located between the Head End Complex 202 and the Cable Modems Simulator 206 to provide an optical-electronic signal interface between the Head End Complex 202 and the Simulated Cable Modems 206. Communication between the Head End Complex 202 and Simulated Cable Modems 208 (via fiber node) is typically implemented using modulated optical signals which travel over fiber optic cables. More specifically, during the transmission of modulated optical signals, multiple optical frequencies are modulated with data and transmitted over optical fibers (not shown) such as, for example, which are typically referred to as "RF fibers". The modulated optical signals transmitted from the Head End Complex 102 eventually terminate at the fiber node, which maintain the signal modulation while converting from the fiber media to the coax media and back.

The Head End Complex 202 and the Simulated Cable Modems 206 typically together form a two-way hybrid fiber-coaxial (HFC) cable network although other types of networks may be used. In order for data to be able to be transmitted effectively over a wide area network such as HFC or other broadband computer networks, a common standard for data transmission is typically adopted. As mentioned above, a commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.) and subsequently by the Society of Cable Television Engineers (SCTE), in documents entitled ANSI/SCTE 22-1 2002 (formerly DSS 02-05) DOCSIS 1.0 Radio Frequency Interface, and SCTE 23-1 2002 (formerly DSS 02-09), DOCSIS 1.1 Part 1: Radio Frequency Interface. These documents are incorporated herein by reference for all purposes.

The CM simulator 206 generally includes a Simulated Cable Modems portion 208 which simulates a plurality of cable modems and a Data Generator and Analyzer portion 210 for analyzing data sent between the Head End Complex 202 and the Multiple CM Simulator 208, as well as generating traffic to be sent back to the Head End Complex 202.

The Simulated Cable Modems 208 receive data downstream from the Head End Complex 202 and transmits data upstream to the Head End Complex 202 via downstream/upstream path 204. The Data Generator and Analyzer 210 receives data from the Head End and generates and sends data back to the Head End via secondary interface 212. The Data Generator and Analyzer 210 also receives data from the Simulated Cable Modems 208 and generates data to be sent to the simulated cable modems. In other words, the Data Generator and Analyzer 210 knows what data is being sent by the Head End 202 to the Simulated Cable Modems 208, what data is actually received by the Simulated Cable Modems 208, what data is being sent from the Simulated Cable Modems 208 to the Head End 202, and what data is actually received at the Head End 202. Accordingly, the Data Generator and Analyzer 210 is capable of monitoring data sent between the Head End 202 and the Simulated Cable Modems 208. By way of examples, the data is monitoring for packet loss, data corruption, propagation delay, and/or other interesting information.

Figure 3:
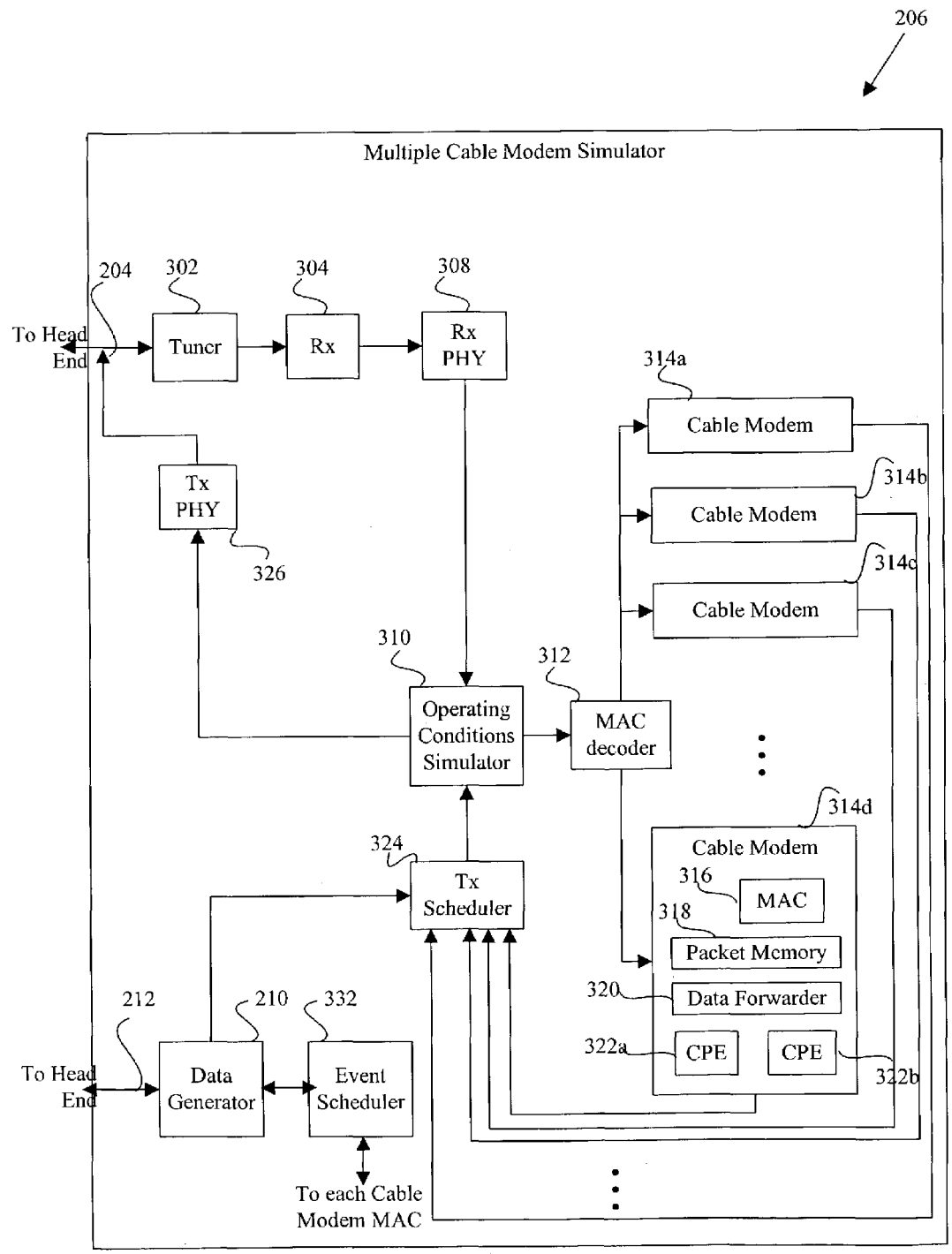
FIG. 3 is a detailed block diagram of the Multiple CM Simulator of FIG. 2 in accordance with one implementation of the present invention.

FIG. 3 is a detailed block diagram of the Multiple CM Simulator 206 of FIG. 2 in accordance with one implementation of the present invention. The Multiple CM Simulator 206 is intended as a logical representation, and is not meant to limit the scope of the invention. The components of the Multiple CM Simulator 206 may be implemented with any suitable combination of hardware and software. Two or more components may integrated into a single device or each component may be implemented within a separate device. For example, the components may be implemented as software executed by a processor and its associated memory and one or more DSP (digital signal processing) devices as further described below with respect to FIG. 11. In an alternative embodiment the components of the Multiple CM Simulator 206 may include one or more custom ASIC (application specific integrated circuits) devices.

As shown, the Multiple CM Simulator 206 receives downstream data from the Head End through bi-directional connection 204. The Multiple CM Simulator 206 also transmits upstream data through connection 204. According to the DOCSIS standard, specific frequency ranges are used for transmitting downstream information from the Head End to the cable modems, and other specific frequency ranges are used for transmitting upstream information from the cable modems to the Head End. Although the upstream and downstream signals are typically multiplexed, separate physical connections may be used.

On the receive side or downstream side, the Multiple Cable Modem Simulator 206 includes a tuner 302, a receiver (Rx) block 304, and an Rx PHY block 308. The tuner 302 generally receives a multiplexed downstream and upstream signal on line 204 and tunes into the downstream channel. In other words, the tuner 302 separates the downstream signal from the upstream signal. For example, as required by the DOCSIS protocol, downstream signals are transmitted at frequencies between 88 and 860 MHz within a 6 MHz wide downstream channel. The tuner 302 outputs the tuned downstream signal to Rx block 304.

The Rx block 304 may include a mixer and amplifier. The mixer may be used to change the frequency of the received downstream signal. The Rx block 304 then outputs the downstream signal to Rx PHY block 308. The Rx PHY block 308 converts the RF formatted downstream signal into an appropriately formatted digital signal that is then output to an Operating Conditions Simulator 310. The Rx block 304 (or receiver block) may incorporate the functions of either or both of the Rx PHY block 308 and the tuner 302.

In general terms, the Operating Conditions Simulator 310 is operable to simulate different affects on the upstream and downstream signal based on particular conditions, such as physical distance from the Head End, of the simulated cable modems. Techniques for simulating various operating conditions are further described below.

After the digital downstream signal is altered to simulate one or more specific operating conditions of a particular cable modem, the downstream signal is then sent to a MAC decoder. The MAC decoder is coupled to a plurality of simulated Cable Modems 314 and is operable to decode the downstream signal and send it to a selected one of the Cable Modems 314.

As shown, the components of each Cable Modem 314 are illustrated in Cable Modem 314d. Each Cable Modem 314 includes a MAC block 316, a packet memory block 318, a data forwarder 320, and one or more customer premise equipment (CPE) blocks 322. Each CPE 322 may be any suitable device which communicates with its associated Cable Modem 314. For example, the CPE may be in the form of a host computer. Each host or CPE may be operable to be initialized like a real host (e.g., by obtaining IP addresses through DHCP or Dynamic Host Configuration Protocol). Each MAC block 316 associated with each Cable Modem 322 generally processes the downstream signal. In one embodiment, each MAC block 316 processes data in the same manner as a DOCSIS compliant cable modem. The data forwarder 320 is operable to send data (e.g., received from the head end) to a selected CPE, when specified as the destination of such data. The Packet Memory 318 may be used to temporarily store data prior to transmission of data or processing of received data.

Turning to the upstream side or transmission side of the Multiple Cable Modem Simulator 206, the data generator 330 may be configured to transmit upstream data through a Tx Scheduler block 324. The Tx Scheduler 324 is operable to determine which Simulated Cable Modem 314 is associated with the transmitted data and then send the data in the time slot associated with the identified Simulated Cable Modem. In order to allow the Simulated Cable Modem 314 to transmit data to the Head End, the Simulated Cable Modems 314 share one or more upstream channels within that domain. Access to the upstream channel may be controlled using a time division multiplexing (TDM) approach.

In the illustrated embodiment, Tx Block 324 sends upstream data through the Operating Condition Simulator 310 to Tx PHY block 326. The Operating Conditions Simulator 310 is generally configured to simulate one or more operating conditions of the identified Simulated Cable Modem, such as distance or power level, as described further below. The Tx PHY block converts the digital signals into RF modulated signals.

Upstream data may also be transmitted by a simulated CPE (e.g., 322a) through its corresponding simulated cable modem. In one implementation, each CPE is configured to initiate transmission by writing data to the appropriate packet buffer. For example, CPE 322a sends data to packet buffer 318 of simulated cable modem 314. After upstream data is written to the appropriate packet memory buffer, the associated MAC block (e.g., 316) then transmits the upstream data through Tx Scheduler 324, the Operating Conditions Simulator 310, and the Tx PHY block 326.

Each Simulated Cable Modem 314 is set up to emulate the data processing of a cable modem. In the illustrated embodiment, each Simulated Cable Modem 314 includes a MAC block 316 that is configured to implement the DOCSIS protocol. As described above with respect to FIG. 2, the Data Generator and Analyzer 210 operates to analyze data sent to the Simulated Cable Modems 208 by the Head End and received by the Simulated Cable Modems 208, as well as generating data to be sent to the Head End via secondary interface 212 or the CPE's associated with the Simulated Cable Modems 208. The secondary interface may be any suitable communication interface for supporting high speed data transmission, such as a bi-directional Gigibyte Ethernet interface.

The Multiple Cable Modem Simulator also includes any suitable mechanism for handling events associated with the Simulated Cable Modems 314 or the Data Generator and Analyzer 210. As shown, such an event scheduler 332 is logically coupled with each of the Simulated Cable Modems 314 and the Data Generator and Analyzer 210. Several embodiments for implementing the operations of the Event Scheduler are described further below with reference to FIG. 7.

In an alternative embodiment, a cable modem simulator may also support multiple downstream and upstream interfaces (frequencies) to support large scale testing. In the downstream direction, this may be implemented with multiple receivers and decoders. In the upstream direction, the system may support multiple modulators. If a DSP based approach is used, output signals can be generated in the digital domain to reflect different upstream frequencies. After D/A conversion, the generated signal may then be modulated on the selected upstream frequency.

Figure 4:
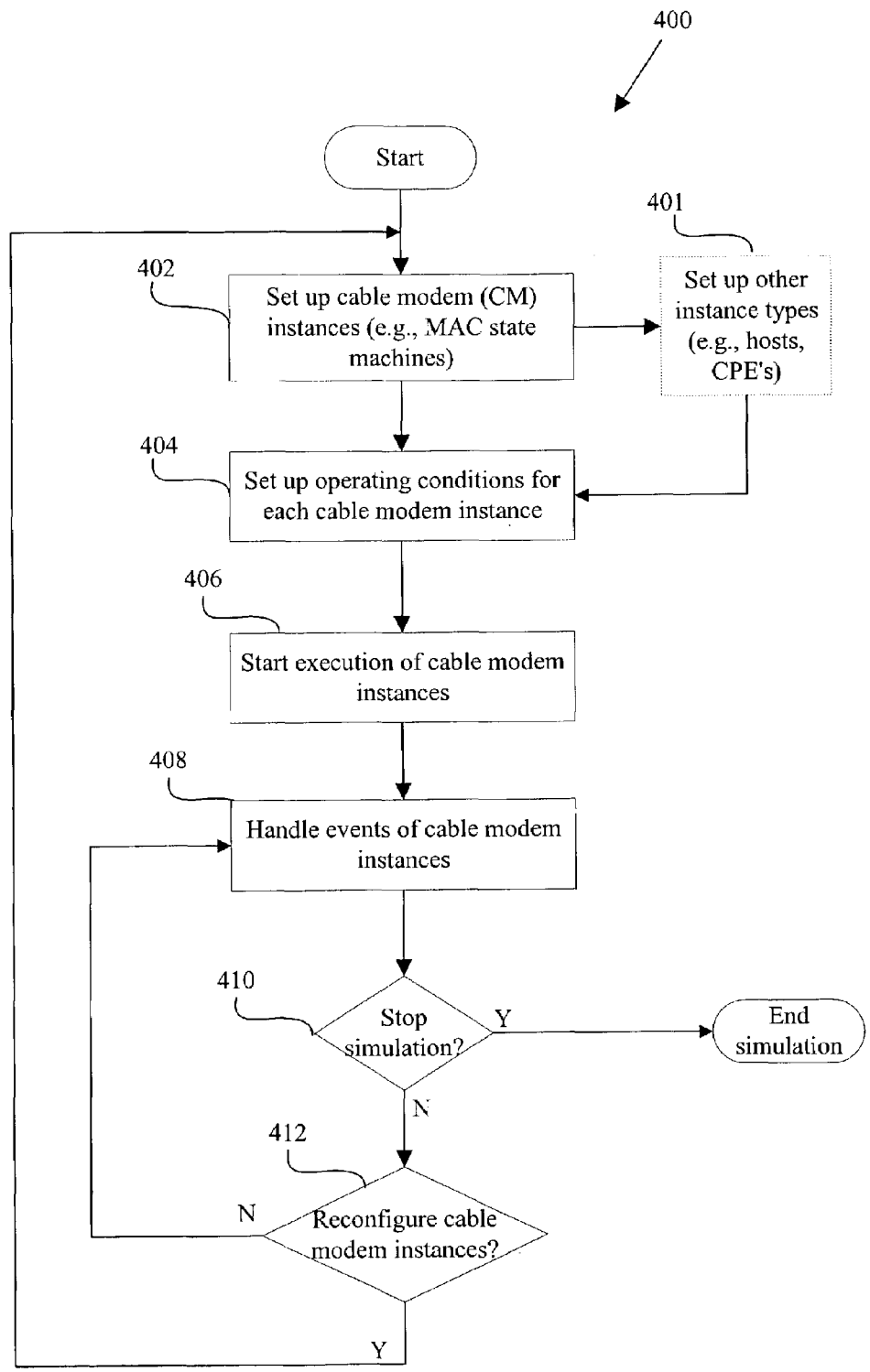
FIG. 4 is a flowchart illustrating a procedure for setting up and initiating execution of a Multiple Cable Modem Simulator in accordance with one embodiment of the present invention.

FIG. 4 is a flowchart illustrating a procedure for setting up and initiating execution of a Multiple Cable Modem Simulator in accordance with one embodiment of the present invention. For instance, the Multiple Cable Modem Simulator 206 of FIGS. 2 and 3 is set up to test the operation of Head End Complex 202 of FIG. 2. Initially, cable modem instances are set up in operation 402. For example, MAC state machines are set up for each Simulated Cable Modems 314 of FIG. 3. Any number and type of cable modem instances may be set up. Additionally, other types of instances may be set up and associated with the Multiple Cable Modem Simulator in operation 401. By way of examples, one or more hosts or customer premise equipment devices (e.g., 322) may be set up for each simulated cable modem or cable modem instance.

Figure 5:
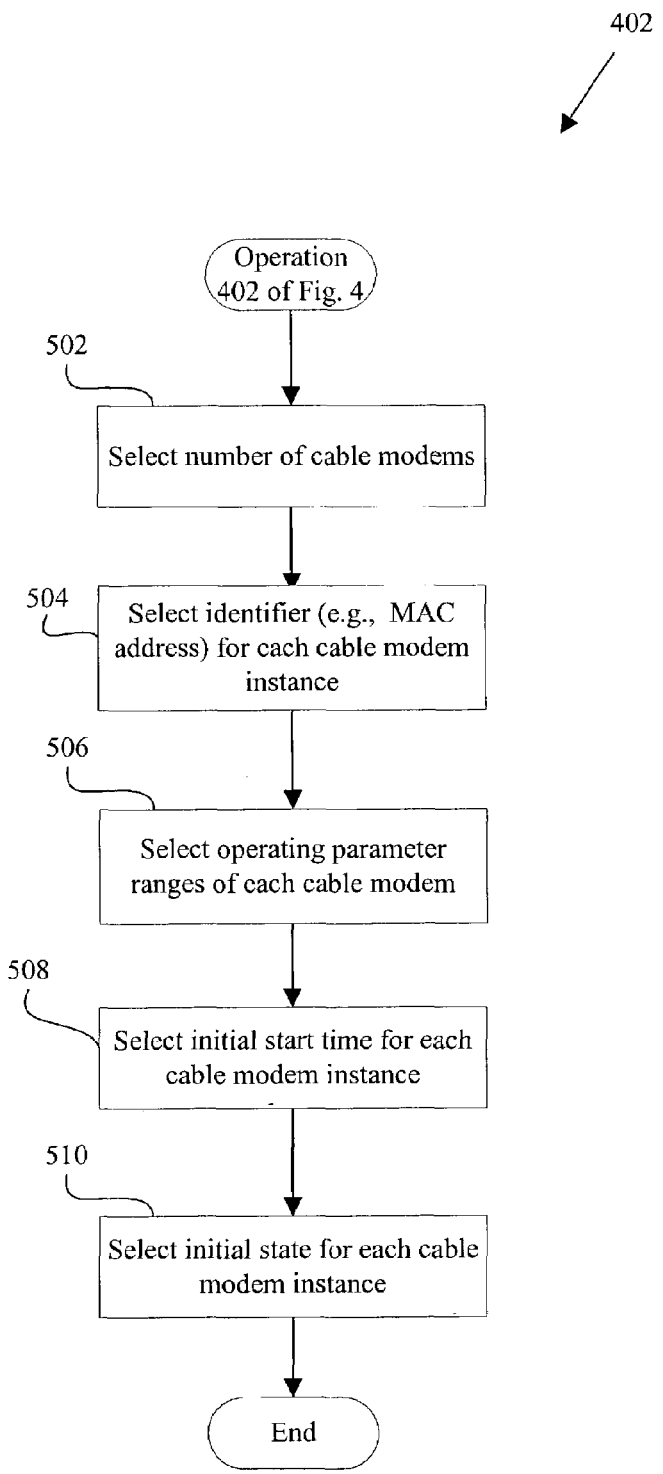
FIG. 5 is a flowchart illustrating the operation of FIG. 4 for setting up one or more cable modem instances in accordance with a specific implementation of the present invention.

FIG. 5 is a flowchart illustrating the operation 404 of FIG. 4 for setting up one or more cable modem instances in accordance with a specific implementation of the present invention. Initially, the number of cable modems is selected in operation 502. An identifier is then selected for each cable modem in operation 504. In one implementation, each cable modem instance is assigned a unique MAC address. Operating condition ranges may then be selected for each cable modem in operation 506. The operating condition ranges may include any suitable type and number of operating variables of a cable modem. Each operating condition range is generally a limit for a particular operating condition of a particular cable modem instance. In specific implementations for a particular simulated cable modem, the operating condition ranges includes a simulated distance range (e.g., 1 to 10 miles) between the Head End and the associated simulated cable modem, a power level range, a set of possible noise insertion profiles, and a range of signal distortion levels. An initial start time for each cable modem instance is then selected in operation 508. An initial state for each cable modem instance is also selected in operation 510. An initial state may include any reasonable cable modem state, such as "Powered Up" or "Downstream Frequency Acquired".

The MAC addresses, operating condition ranges, initial start times, and initial cable modem states may be preconfigured or assigned randomly after the number of cable modem instances is selected. In specific examples, the number of cable modem instances, MAC addresses, operating condition ranges, initial start times, and initial cable modem states are selected by writing values to a table. In one embodiment, a table in created for each cable modem instance, and each table includes the MAC address, operating condition ranges, initial start time, and initial state for a specific cable modem instance.

Figure 6:
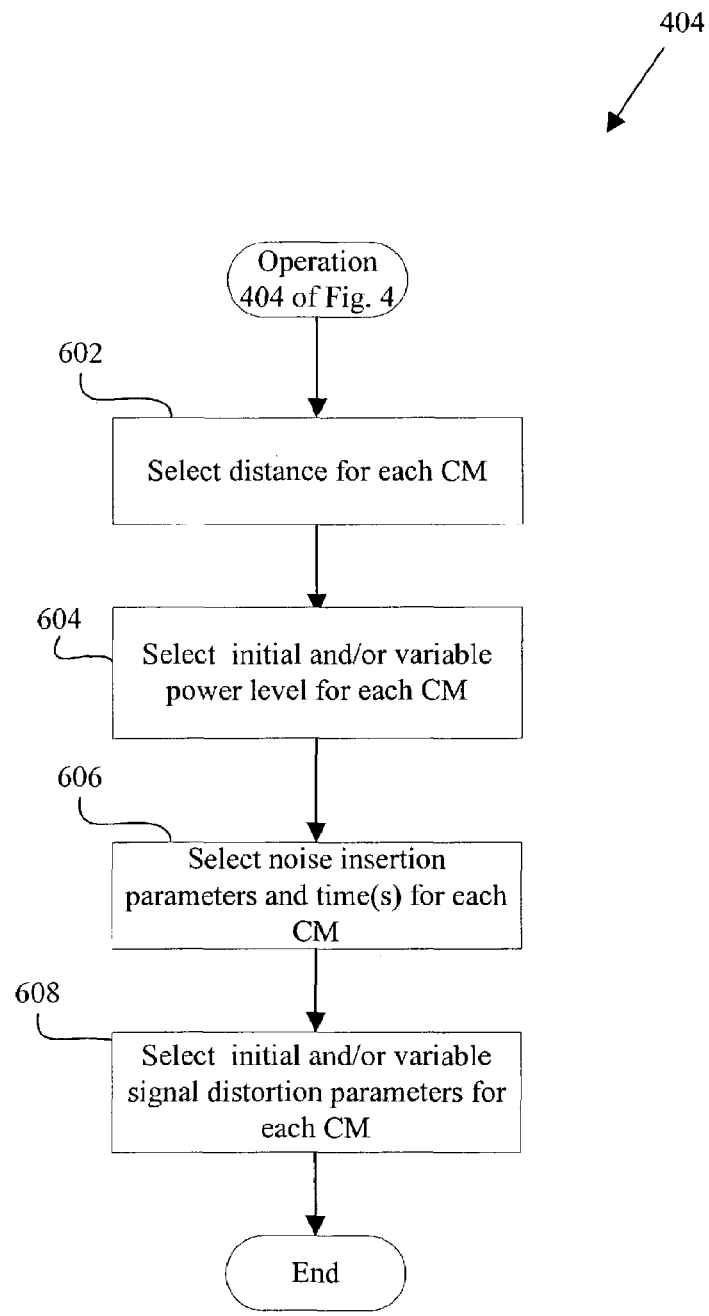
FIG. 6 is a flowchart illustrating the operation of FIG. 4 for setting up the operating conditions for each cable modem instance in accordance with one embodiment of the present invention.

Referring back to the Multiple Cable Modem Simulator set up and execution procedure of FIG. 4, one or more simulated operating conditions may then be set up for each cable modem instance in operation 404. FIG. 6 is a flowchart illustrating the operation 404 of FIG. 4 for setting up the operating conditions for each cable modem instance in accordance with one embodiment of the present invention. In one implementation, these operating condition values are added to a table associated with each cable modem instance. Initially, a distance may be selected for each cable modem in operation 602. That is, the distance between each simulated cable modem and the Head End complex is selected. An initial and/or variable power level may then be selected for each cable modem in operation 604. Each simulated cable modem may simulate an initial power level for data transmission, as well as vary such simulated power level with time. Noise insertion parameters and times may also be selected for each cable modem in operation 606. For instance, noise levels may be selected to be inserted once or periodically into the transmitted upstream signal for one or more simulated cable modems. Likewise, an initial and/or variable signal distortion parameters may then be selected for each cable modem in operation 608.

After the Multiple Cable Modem Simulator has been set up, execution of the cable modem instances then commences in operation 406 of FIG. 4. Events of the cable modem instances are then handled in operation 408. Periodically or after each event is handled or processed, it then may be determined whether the simulation is complete in operation 410. If the simulation is complete, the simulation then ends. If the simulation is not complete, it may then be determined whether the cable modem instances are to be reconfigured in operation 412. For example, the operating conditions or functions of the existing Simulated Cable Modems or the number of Simulated Cable Modems 208 may be altered. If the cable modem instances are to be reconfigured, one or more of operations 402 through 406 of the simulation procedure 400 may then be repeated. If no cable modem instances are to be reconfigured, event handling then recommences in operation 408.

Figure 7:
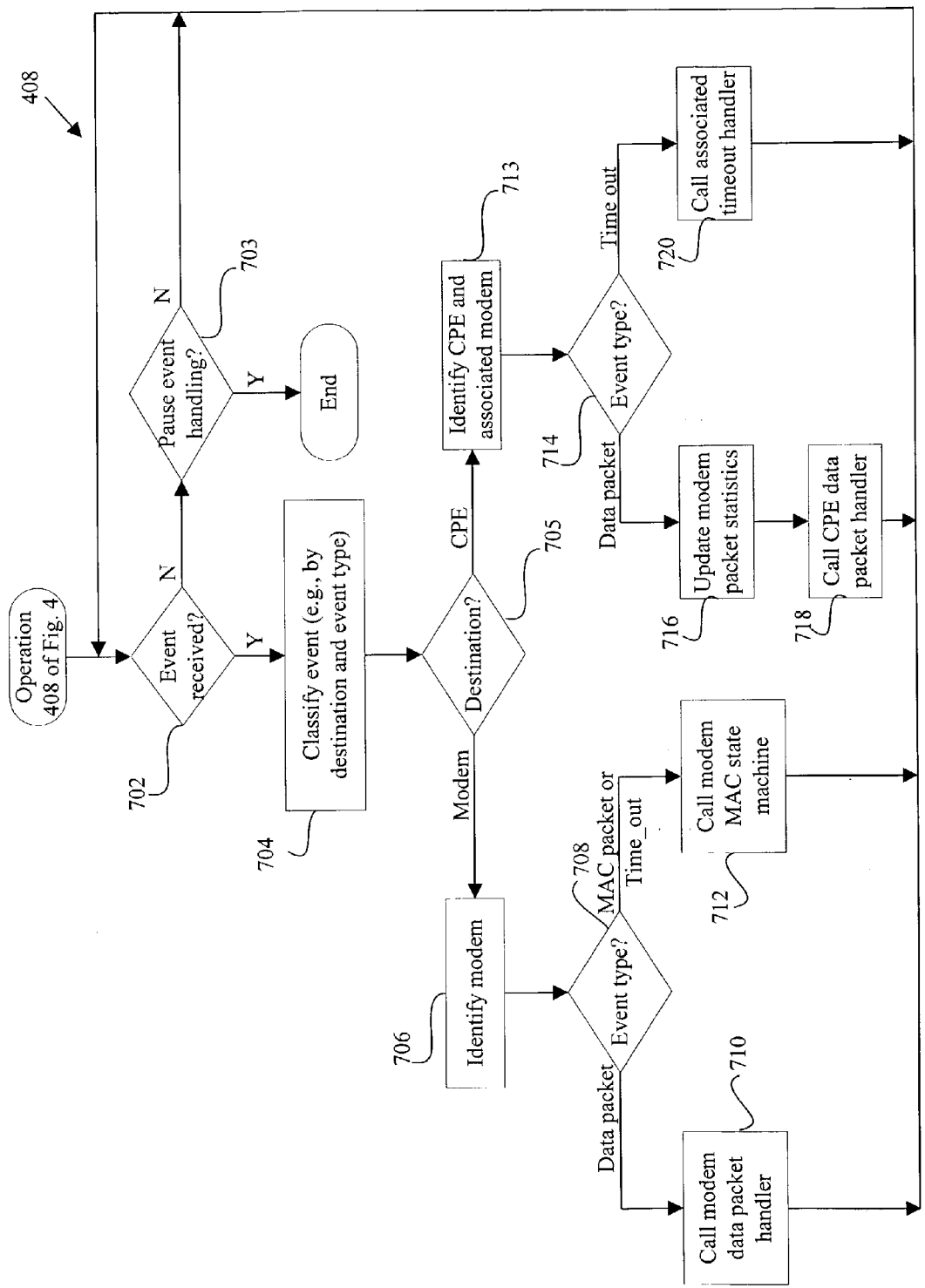
FIG. 7 is a flowchart illustrating the operation of FIG. 4 for handling events within the Multiple Cable Modem Simulator in accordance with one embodiment of the present invention.

Event handling may be implemented by the Multiple Cable Modem Simulator in any suitable manner, and such techniques are well known. FIG. 7 is a flowchart illustrating the operation 408 of FIG. 4 for handling events within the Multiple Cable Modem Simulator in accordance with one embodiment of the present invention. Initially, it is determined whether an event has been received in operation 702. In effect, the event handler waits for an event to be received. If an event is not received, it may then be determined whether to pause event handling in operation 703. If event handling is to be paused, the event handling procedure ends and the process returns to operation 410 of FIG. 4, where it is determined whether the cable modem simulation is to stop. Determining whether to pause may be performed periodically or based on any suitable parameter, such as expiration of a predefined pause timer. Alternatively, event handling may end after each received event is handled.

If an event is received by the event handler in operation 702, the event is then classified in operation 704. Classification may include any suitable parameter or condition that affects processing of the received event. In one specific implementation, the event is classified by destination and event type. For example, the event's destination may be classified as a cable modem destination or a CPE destination, while the event type may be classified as a data packet, a MAC packet, or a time out. The event may be classified in any suitable manner. In one implementation, the possible event formats are matched, for example, in a table to specific destination and event types.

After the event is classified, the destination classification of the event is then determined in operation 705. When the destination classification is determined to be a modem, the modem is then identified in operation 706. For instance, the event is associated with a MAC address of a simulated cable modem. In one example, the event may be associated with data which includes a particular cable modem MAC address (e.g., as a source or destination). The event type is then determined in operation 708. If the event type is determined to be a data packet, a modem data packet handler is called for the particular identified modem in operation 710. Otherwise, if the event type is equal to a MAC packet or a time out, a modem MAC state machine for the identified modem is then called in operation 712. After processing of the event, the operation 408 then returns to waiting for an event in operation 702.

If the destination is classified as a CPE, the CPE and its associated modem are then identified in operation 713. The event type is then determined in operation 714. If the event type is equal to a data packet, the modem packet statistics may then be updated in operation 716. Modem packet statistics may include all statistics information required per the DOCSIS Operations Support System Interface (OSSI) specifications, such as number of packets received, number of bytes received, and a variety of other information. A CPE data packet handler is then called in operation 718. If the event type is a time out, the associated time out handler is called in operation 720. After either the data packet or time out event is processed, the procedure 408 returns to waiting for an event in operation 702.

Figure 8:
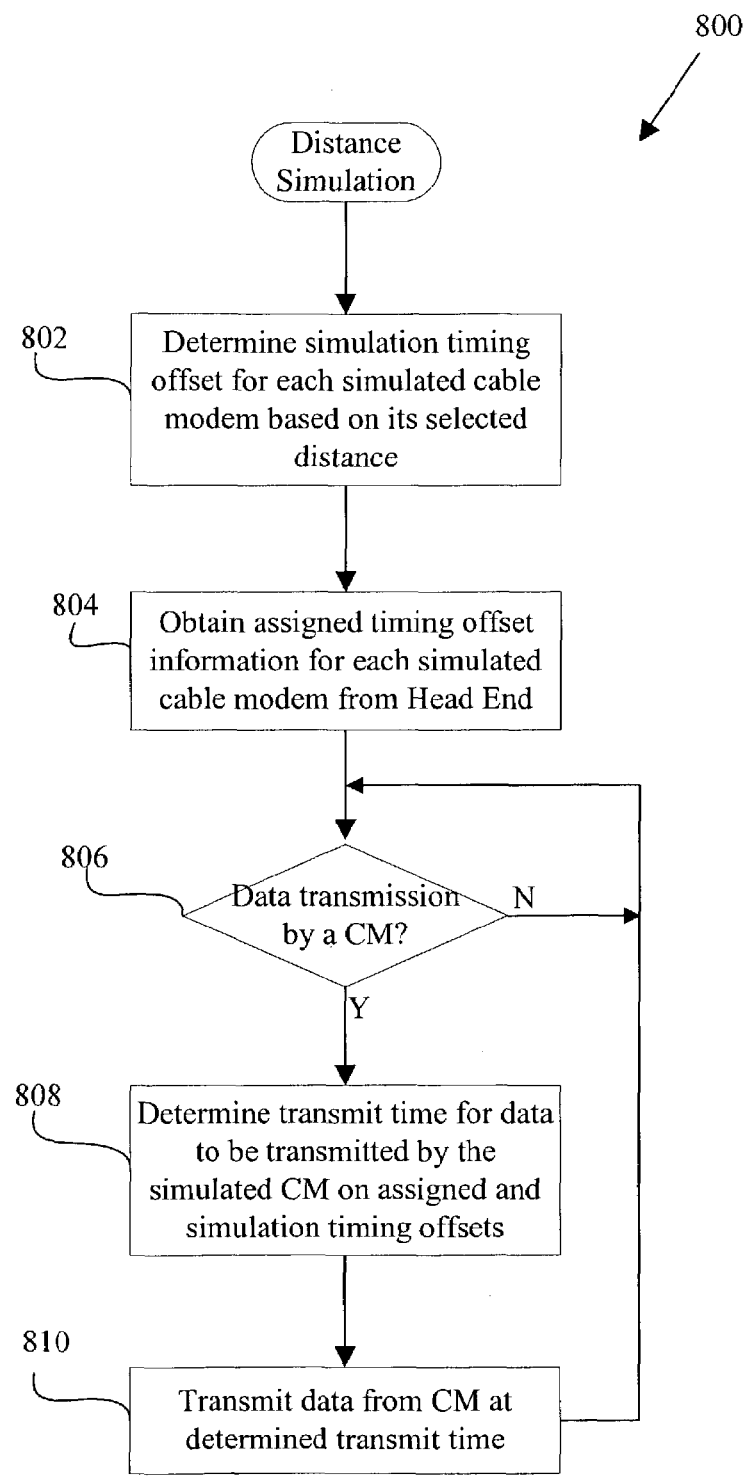
FIG. 8 is a flowchart illustrating a procedure for simulating a distance for one or more simulated cable modems in accordance with one possible implementation of the present invention.
Figure 9:
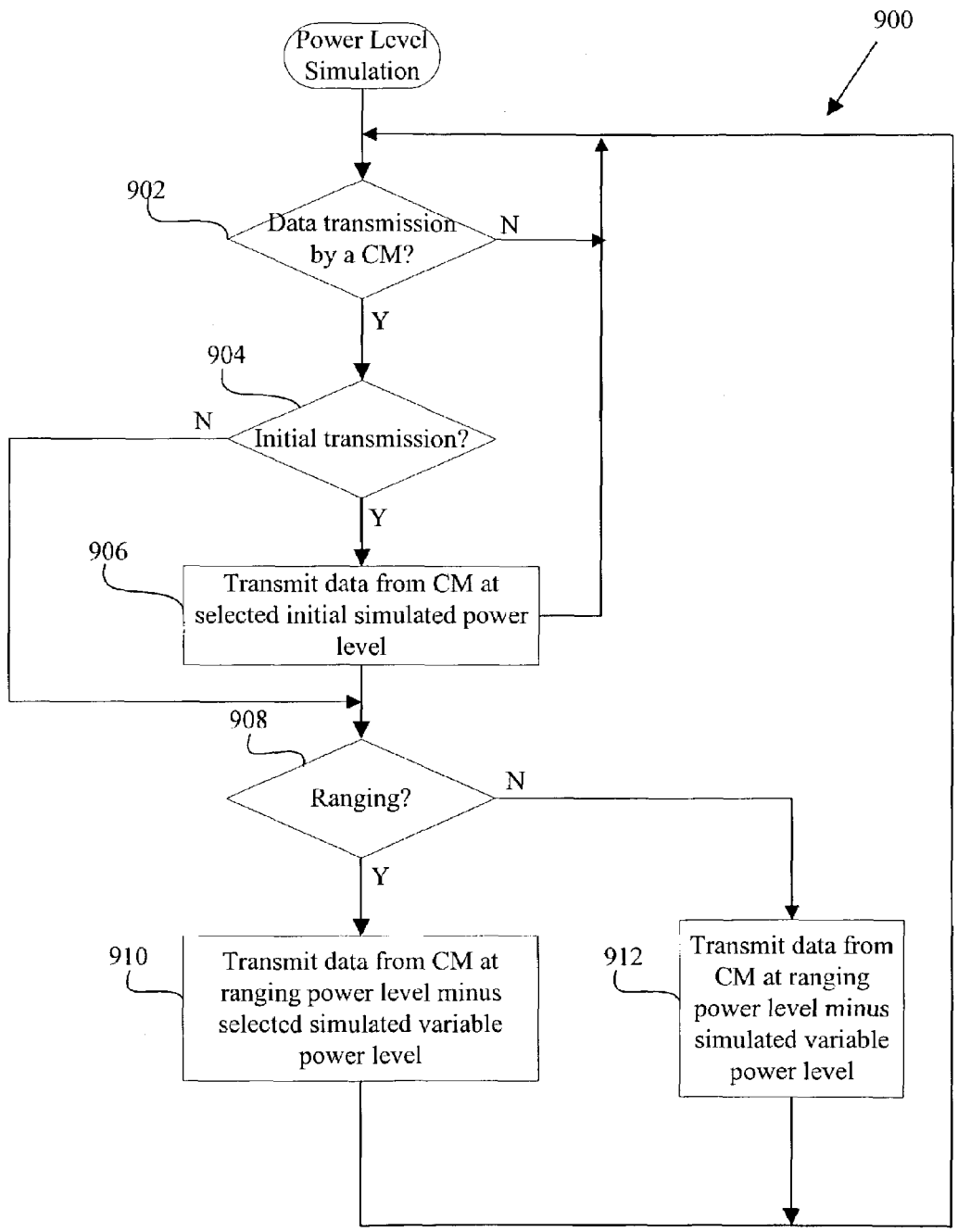
FIG. 9 is a flowchart illustrating a procedure for simulating one or more power levels for one or more simulated cable modems in accordance with one possible implementation of the present invention.
Figure 10:
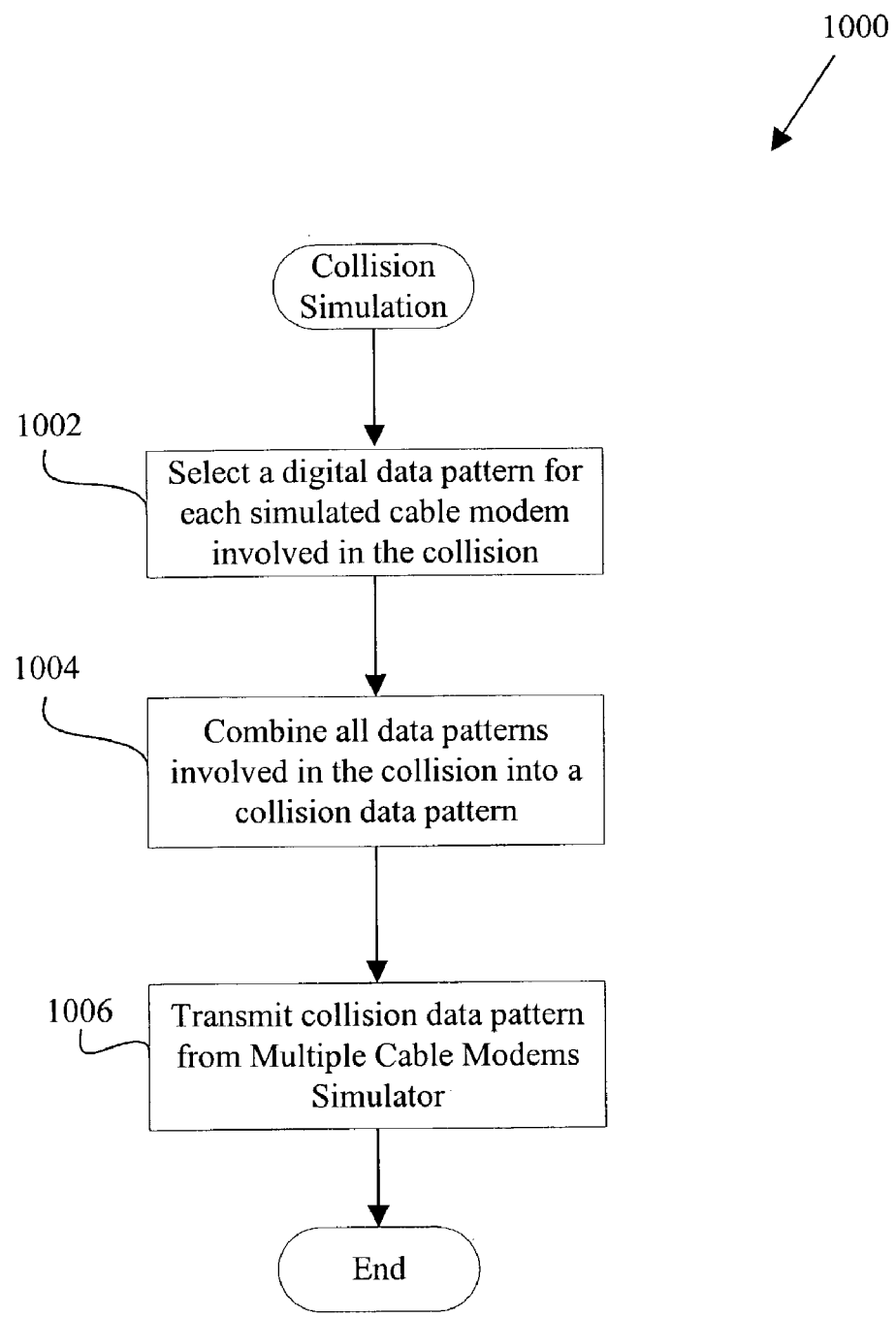
FIG. 10 is a flowchart illustrating a procedure for simulating collisions in accordance with one embodiment of the present invention.

As events are handled and data is communicated between the simulated cable modems and the Head End, for example, one or more operating conditions may be simulated for each simulated cable modem as data is transmitted and received by each simulated cable modem. FIGS. 8 through 10 are flowcharts that illustrate procedures for simulating various operating conditions for one or more of the simulated cable modems. One or more of these operating conditions may be simulated simultaneously on data associated with a particular simulated cable modem or individually on data sent at different times. Although the following techniques are mostly described with respect to simulating operating conditions for data that is to be transmitted to the head end, of course, these techniques can be easily applied to data that is being received by a simulated cable modem.

FIG. 8 is a flowchart illustrating a procedure 800 for simulating a distance for one or more simulated cable modems in accordance with one possible implementation of the present invention. Initially, simulation timing offsets are determined for each simulated cable modem based on its selected distance from the Head End (e.g., selected in operation 602 of FIG. 6) in operation 802. Alternatively, timing offsets for each cable modem may be directly selected without first setting distance values.

An assigned timing offset is also obtained for each simulated cable modem from the Head End in operation 804. The assigned timing offset may be obtained in any suitable manner. For example, each simulated cable modem receives an assigned timing offset during its initial ranging with the CMTS of the Head End.

Before reliable two-way communication is achieved between the head end and the cable modem, a ranging process is typically performed between the Head End and the simulated cable modem that wishes to communicate with the Head End. The ranging process includes an initial ranging process to configure particular parameters of the cable modem for reliable communication. Specifically, the head end tells the cable modem what time slot of what frequency range the cable modem should use, as well as other parameters.

After these the simulation and assigned timing offsets are determined, the transmission time may be determined and used to transmit data from a simulated cable modem. In the illustrated embodiment, a transmission event handling procedure is exemplified in operations 806 through 810. The procedures waits in operation 806 for a transmission event to be initiated by one of the simulated cable modems. When a transmission event occurs or data is to be transmitted by a simulated cable modem, a transmit time may then be determined for the data to be transmitted in operation 808. The transmit time may be calculated by adding the simulation timing offset to the current time to result in a delay that thereby simulates distance, and then subtracting the timing offset assigned by the CMTS from the result to calculate the correct transmit time. The data is then transmitted at the determined transmit time in operation 810.

In an alternative implementation, a minimum and maximum timing offset value may be specified. Additionally, distribution parameters such as pure random or a statistical distribution around a midpoint may also be specified. In these two implementations, a simulated distance is randomly simulated within the specified parameters for each simulated cable modem.

Other operating conditions may also be simulated, such as an initial and variable power level for each simulated cable modem. FIG. 9 is a flowchart illustrating a procedure 900 for simulating one or more power levels for one or more simulated cable modems in accordance with one possible implementation of the present invention. It may be desirable to simulate power level variance per each simulated cable modem. Preferably, the power level is varied during initial ranging. During ranging, the head end specifies particular power adjustments for signals transmitted by a particular simulated cable modem such that all of the simulated cable modems that are currently communicating with the Head End transmit signals to the Head End at about the same power levels. Prior to adjustment, individual simulated cable modems will be configured to transmit signals that are received by the Head End at different power levels because of wide variances between the different signal paths between each cable modem and Head End. In a specific implementation, the power level is also varied during data transmission (i.e., after initial ranging). This would, for example, enable simulation of modems which have reached their maximum transmit power.

Referring to the embodiment of FIG. 9, it is first determined whether data is to be transmitted by a simulated cable modem in operation 902. The process waits in operation 902 until data is to be transmitted. When data is to be transmitted, it is then determined whether this is an initial transmission in operation 904. If this is an initial transmission, data is then transmitted at the selected initial power level (e.g., selected during the operating conditions set up procedure illustrated in FIG. 6) in operation 906.

If this is not an initial transmission, operation 906 is skipped and it is then determined whether ranging is being performed in operation 908. If ranging is being performed, the data is transmitted at the ranging power level minus the selected simulated variable power level. For instance, the ranging power level is received from the CMTS of the Head End or computed from the received power level. The simulated variable power level may be in any suitable format for indicating different power levels after the initial transmission. For example, a first set of power levels at specific or periodic times may be specified for ranging and a second set of power levels may be specified for data transmission after ranging. If ranging is not being performed, data is then transmitted at the final ranging power level minus the simulated variable power level.

The final power level of the transmitted data may be implemented in any suitable manner. In one implementation, the data signal is processes by a digital signal processor (DSP) which alter the power level of the data signal.

Noise insertion may also be simulated on the transmitted data for each simulated cable modem. For instance, specialized hardware, such as a DSP, is used to insert noise into the data signal transmitted from individual simulated cable modems. A specific noise profile may be selected for each cable modem which specifies noise levels at specific times. The data signal may also be pre-distorted in a predefined manner for each simulated cable modem. Noise insertion and signal distortion may be accomplished in a manner similar to the procedure for simulating an initial and/or variable power level as described above with reference to FIG. 9.

Multiple modems may cause collisions in contention slots, such as initial ranging or bandwidth request slots. The Multiple Cable Modem Simulator preferably also simulates such conditions, since the presence and detection of collisions is essential for the CMTS, to enable it to detect and correct contention in the upstream channel. FIG. 10 is a flowchart illustrating a procedure 1000 for simulating collisions in accordance with one embodiment of the present invention. Initially, a digital data pattern may be selected for each simulated cable modem determined to be involved in the collision in operation 1002. The data patterns for data involved in the collision are then combined into a single collision data pattern in operation 1004. The collision data pattern is then transmitted from the Multiple Cable Modem Simulator in operation 1006. Any suitable hardware, such as a DSP, may be used to generate the collision data pattern.

Operating conditions may change over time. The upstream or downstream path to and from all or some of the modems may fail. Individual modems may disconnect or be powered off. Modems may be moved from one interface to another. The distance or attenuation associated with a modem may change. Return path amplifiers may fail or change their operating parameters (noise, signal distortion etc). Accordingly, the modem simulator preferably also supports changing operating conditions such as the ones mentioned above.

Generally, the simulator of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the simulator of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the simulator devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the simulator of this invention may be implemented on a general-purpose network host machine such as a personal computer or workstation. Further, the invention may be at least partially implemented on a card (e.g., an interface card) for a network device or a general-purpose computing device.

Figure 11:
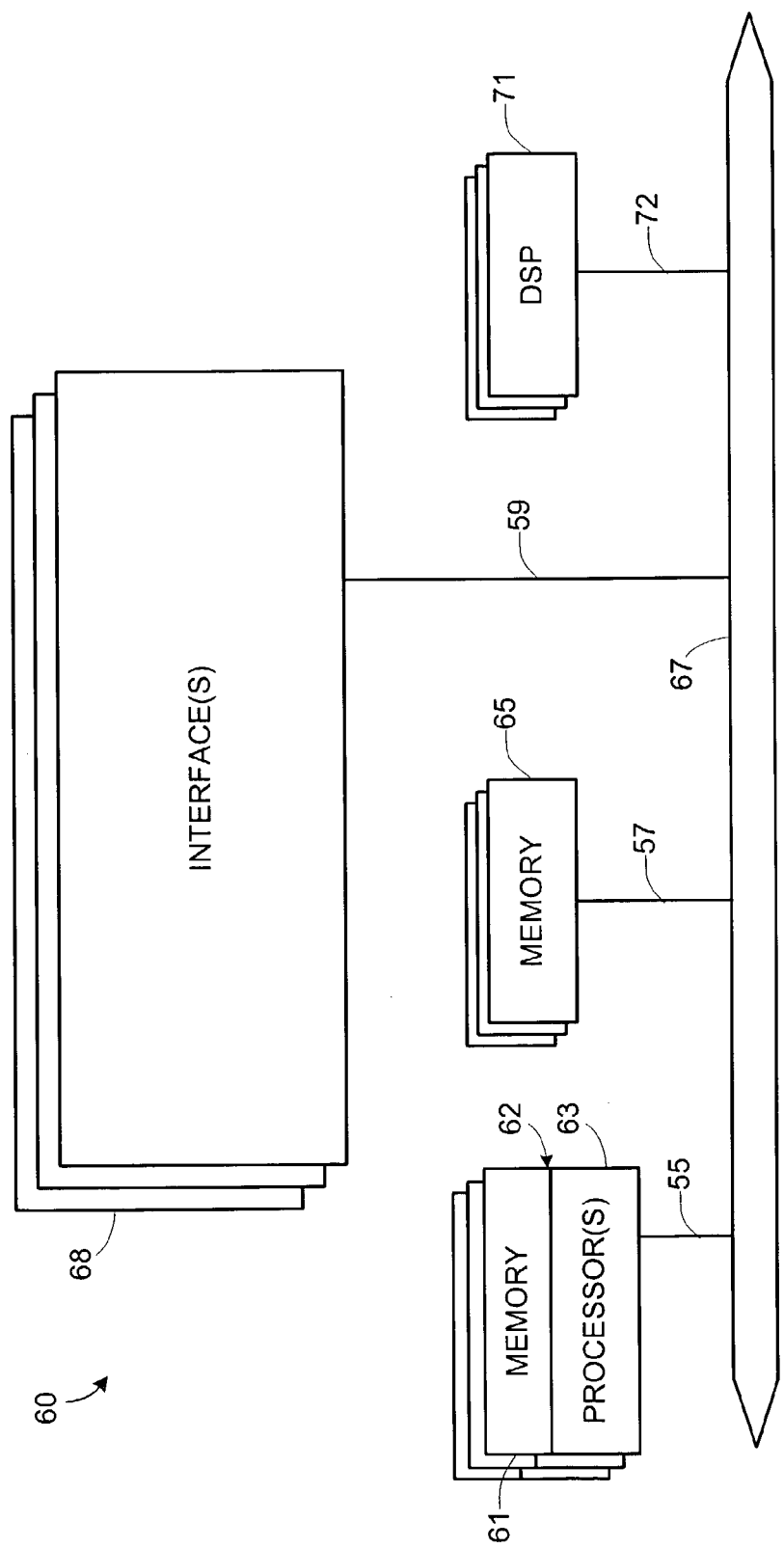
FIG. 11 is a diagrammatic representation of a network device suitable for implementing the multiple cable modem simulator of the present invention.

Referring now to FIG. 11, a network device 60 suitable for implementing the simulator of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a Multiple Cable Modem Simulator, the CPU 62 may be responsible for simulating cable modem instances, data transmission scheduling, processing of received data, simulating CPE instances, generating data for transmission by the simulator, analyzing data received by the simulator, handling events within the simulator, simulating physical operating conditions of the simulated cable modems, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

The system 60 may also include one or more DSP devices 71 coupled to bus 67 via 72. One of the DSP devices may be operable to simulate various alterations to the transmitted data signal. For example, a DSP may be used to simulate distance and variable power levels for a particular simulated cable modem. By way of another example, a DSP may used to simulate a data transmission collision as described above.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the Multiple Cable Modem Simulator described herein. The program instructions may control the operation of an operating system and/or one or more applications, for example. The memory or memories may also be configured to store simulated cable modems, simulated CPE instances, selected operating conditions and ranges for the simulated cable modems, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, although the Multiple Cable Modem Simulator of the present invention is described in relation to testing of a Head End Complex, of course, any suitable type of device may be tested in relation to the simulator, such as an Internet Service Provider. Accordingly, the present embodiments are to be considered as illustrative and not restrictive, and the invention is not to be limited to the details given herein, but may be modified within the scope and equivalents of the appended claims.

What is claimed is:

1. A multiple cable modem simulator system for simulating a plurality of cable modems within a test system that includes a test device whose operation is being tested in relation to the simulated cable modems, comprising:
    a plurality of simulated cable modems operable to emulate a plurality of cable modems in communication with the test device through a multiplexed downstream/upstream channel;
    an operating conditions simulator operable to simulate one or more physical operating conditions of the simulated cable modems; and
    a data generator and analyzer for generating data to be sent from the simulated cable modems to the test device and for analyzing data sent between the simulated cable modems and the test device, wherein the data generator and analyzer provides a secondary interface, in addition to the downstream/upstream channel, for communicating with the test device.

2. A system as recited in claim 1, wherein the plurality of simulated cable modems and the operating conditions simulator takes the form of a processor, one or more memory devices, and one or more digital signal processing (DSP) devices.

3. A system as recited in claim 1, wherein the simulated cable modems and the operating conditions simulator are integrated within a single device.

4. A system as recited in claim 1, further comprising a receiver for receiving a multiplexed downstream and upstream signal from the test device on the downstream/upstream channel and tuning the multiplexed signal so as to output the downstream signal to a selected one of the simulated cable modems, wherein the receiver is also operable to convert the downstream signal from a modulated format into a digital format.

5. A system as recited in claim 4, further comprising a media access controller (MAC) decoder coupled to the operating conditions simulator so as to receive the downstream signal and to output it to a selected one of the simulated cable modems.

6. A system as recited in claim 5, wherein each simulated cable modem comprises a MAC instance for performing data processing operations of a DOCSIS compatible cable modem.

7. A system as recited in claim 6, further comprising one or more simulated customer premises equipment (CPE) devices associated with one or more of the simulated cable modems.

8. A system as recited in claim 7, wherein each simulated cable modem that is associated with one or more of the simulated CPE's further comprises a data forwarder for forwarding data received by the each simulated cable modem to a selected associated simulated CPE.

9. A system as recited in claim 8, wherein at some of the simulated CPE's is a simulated host computer configured to send and receive voice, video, and data packets.

10. A system as recited in claim 9, further comprising:
    a transmission scheduler for scheduling data transmitted from the simulated cable modems to the test device, wherein the transmission scheduler is configured to receive data transmitted from the simulated cable modems and transmit the data as an upstream signal to the test device; and
    a transmission device for converting the upstream signal's format from a digital format to a modulated format.

11. A system as recited in claim 10, wherein the data generator and analyzer is further operable to generate data and transmit it through a selected one of the simulated cable modems to the transmission scheduler.

12. A system as recited in claim 10, wherein the transmission scheduler is further operable to identify a sending one of the simulated cable modems and then transmit data from the sending simulated cable modem in a time slot associated with such sending simulated cable modem.

13. A system as recited in claim 10, wherein the transmission scheduler is further operable to time multiplex data sent from the simulated cable modems onto the upstream signal.

14. A system as recited in claim 11, wherein the operating conditions simulator is coupled with the transmission scheduler so as to be capable of receiving the upstream signal from the transmission scheduler, wherein the operating condition simulator is operable to simulate one or more physical operating conditions on the upstream signal.

15. A system as recited in claim 13, further comprising an event handler for handling events initiated by the simulated cable modems and the data generator and analyzer.

16. A system as recited in claim 13, further comprising:
a plurality of receivers for receiving a plurality of multiplexed downstream and upstream signals from the test device on a plurality of downstream/upstream channels and outputting a plurality of downstream signals;
a plurality of MAC decoders for each receiving a selected one of the downstream signals and for outputting it to a selected one of the simulated cable modems,
wherein the simulated modems are grouped into sets and the simulated cable modem sets are operable to transmit data in the form of a plurality of upstream signals; and
a plurality of transmission device converting a selected one of the upstream signal's format from a digital format to a modulated format.

17. A system as recited in claim 1, wherein the operating conditions of the simulated cable modems are each a simulated distance between each simulated cable modem and the test device.

18. A system as recited in claim 1, wherein the operating conditions of the simulated cable modems are each a simulated power level of a data signal transmitted by each simulated cable modem.

19. A system as recited in claim 1, wherein the operating conditions of the simulated cable modems are selected from a group consisting of a simulated distance between each simulated cable modem and the test device, a simulated power level, a simulated noise insertion, a simulated signal distortion of a data signal transmitted by each simulated cable modem, and a simulated collision data transmitted from two or more of the simulated cable modems.

20. A system as recited in claim 13, wherein the test device is a head end complex.

21. A method for simulating a plurality of cable modems, the method comprising:
setting up a plurality of simulated cable modem instances;
setting up a plurality of operating conditions for the simulated cable modem instances;
commencing execution of the simulated cable modem instances; and
handling events associated with the simulated cable modem instances, wherein the events include monitoring of data sent between the simulated cable modem instances and a test device whose operation is being tested with respect to the simulated cable modem instances.

22. A method as recited in claim 21, further comprising setting up one or more simulated customer premise equipment (CPE) instances associated with one or more of the simulated cable modem instances.

23. A method as recited in claim 21, wherein each simulated cable modem instance is in the form of a media access controller (MAC) instance which emulates the operations of a DOCSIS compliant cable modem.

24. A method as recited in claim 21, wherein the test device is a head end complex.

25. A method as recited in claim 21, wherein setting up the simulated cable modem instances comprises:

selecting a number of simulated cable modem instances;
selecting an identifier for each simulated cable modem instance; and
selecting an initial execution time for each simulated cable modem instance.

26. A method as recited in claim 25, wherein the identifier for each simulated cable modem instance is a unique MAC address.

27. A method as recited in claim 25, further comprising:
selecting an initial state of each simulated cable modem instance; and
selecting one or more operating condition ranges for each simulated cable modem instance, wherein each operating range defines a limit to a simulating cable modem's simulated operation.

28. A method as recited in claim 21, wherein the operating conditions for each simulated cable modem is set up by selecting an initial and/or variable power level for a data signal transmitted from the each simulated cable modem.

29. A method as recited in claim 21, wherein the operating conditions for each simulated cable modem include a simulated timing offset for a data signal transmitted from the each simulated cable modem so as to simulate a distance between the each simulated cable modem and the test device.

30. A method as recited in claim 21, wherein the operating conditions for each simulated cable modem are selected from a group consisting of a simulated distance between each simulated cable modem and the head end, a simulated power level, a simulated noise insertion, and a simulated signal distortion of a data signal transmitted by each simulated cable modem.

31. A method as recited in claim 30, wherein the simulated noise insertion defines a plurality of noise levels to be inserted into the data signal at a plurality of times.

32. A method as recited in claim 31, wherein the simulated signal distortion defines a plurality of signal distortion profiles to be simulated onto the data signal at a plurality of times.

33. A method as recited in claim 29, further comprising:
obtaining an assigned timing offset for each simulated cable modem instance; and
when data is to be transmitted from a selected simulated cable modem instance to the test device, delaying such data transmission by an amount equal to the selected simulated timing offset minus the assigned timing offset.

34. A method as recited in claim 33, further comprising:
when data is to be received by a selected simulated cable modem instance from the test device, delaying such data receipt by an amount equal to the selected simulated timing offset.

35. A method as recited in claim 28, further comprising:
when data is to be transmitted from a selected simulated cable modem instance to the test device in the form of a data signal, adjusting a power level of the data signal to be about equal to the selected initial or the variable power level.

36. A method as recited in claim 35, wherein the test device is a head end complex and the power level of the data signal is varied during a periodic ranging operation with the head end complex.

37. A method as recited in claim 36, wherein the power level of the data signal is also varied after a periodic ranging operation with the head end complex.

38. A method as recited in claim 21, wherein the operating conditions include a simulated collision of data transmitted from two or more of the simulated cable modems to the test device.

39. A method as recited in claim 38, further comprising:
selecting a digital data pattern for each of the two or more simulated cable modems which are to have a collision;
combining the digital data patterns for the two or more simulated cable modems which are to have a collision into a single simulation data pattern; and
transmitting the simulation data pattern to the test device.

40. A computer readable medium containing program instructions for simulating a plurality of cable modems, the computer readable medium comprising:
computer readable code for setting up a plurality of simulated cable modem instances;
computer readable code for setting up a plurality of operating conditions for the simulated cable modem instances;
computer readable code for commencing execution of the simulated cable modem instances; and
computer readable code for handling events associated with the simulated cable modem instances, wherein the events include monitoring of data sent between the simulated cable modem instances and a test device whose operation is being tested with respect to the simulated cable modem instances.

41. A computer readable medium as recited in claim 40, further comprising setting up one or more simulated customer premise equipment (CPE) instances associated with one or more of the simulated cable modem instances.

42. A computer readable medium as recited in claim 40, wherein each simulated cable modem instance is in the form of a media access controller (MAC) instance which emulates the operations of a DOCSIS compliant cable modem.

43. A computer readable medium as recited in claim 40, wherein setting up the simulated cable modem instances comprises:
selecting a number of simulated cable modem instances;
selecting an identifier for each simulated cable modem instance; and
selecting an initial execution time for each simulated cable modem instance.

44. A computer readable medium as recited in claim 40, wherein the operating conditions for each simulated cable modem are selected from a group consisting of a simulated distance between each simulated cable modem and the head end, a simulated power level, a simulated noise insertion, and a simulated signal distortion of a data signal transmitted by each simulated cable modem.

45. A computer readable medium as recited in claim 44, wherein the simulated noise insertion defines a plurality of noise levels to be inserted into the data signal at a plurality of times.

46. A computer readable medium as recited in claim 45, wherein the simulated signal distortion defines a plurality of signal distortion profiles to be simulated onto the data signal at a plurality of times.

47. A computer readable medium as recited in claim 44, further comprising:
obtaining an assigned timing offset for each simulated cable modem instance; and
when data is to be transmitted from a selected simulated cable modem instance to the test device, determining a simulated timing offset for the selected simulated cable modem based on the simulated distance and delaying such data transmission by an amount equal to the selected simulated timing offset minus the assigned timing offset.

48. A computer readable medium as recited in claim 47, further comprising:
when data is to be received by a selected simulated cable modem instance from the test device, delaying such data receipt by an amount equal to the simulated timing offset.

49. A computer readable medium as recited in claim 48, further comprising:
when data is to be transmitted from a selected simulated cable modem instance to the test device in the form of a data signal, adjusting a power level of the data signal to be about equal to the selected initial or the variable power level.

50. A computer readable medium as recited in claim 49, wherein the operating conditions include a simulated collision of data transmitted from two or more of the simulated cable modems to the test device.

51. A computer readable medium as recited in claim 50, further comprising:
selecting a digital data pattern for each of the two or more simulated cable modems which are to have a collision;
combining the digital data patterns for the two or more simulated cable modems which are to have a collision into a single simulation data pattern; and
transmitting the simulation data pattern to the test device.

52. An apparatus for simulating a plurality of cable modems within a test system that includes a test device whose operation is being tested in relation to the simulated cable modems, comprising:
means for simulating a plurality of cable modems so as to emulate a plurality of cable modems in communication with the test device through a multiplexed downstream/upstream channel;
means for simulating a plurality of physical operating conditions of the simulated cable modems; and
means for generating data to be sent from the simulated cable modems to the test device;
means for analyzing data sent between the simulated cable modems and the test device; and
means for providing a secondary interface, in addition to the downstream/upstream channel, for communicating with the test device.

* * * * *